Dec. 26, 1950     J. S. ALLEN     2,535,250
COMPUTING SYSTEM
Filed April 18, 1944
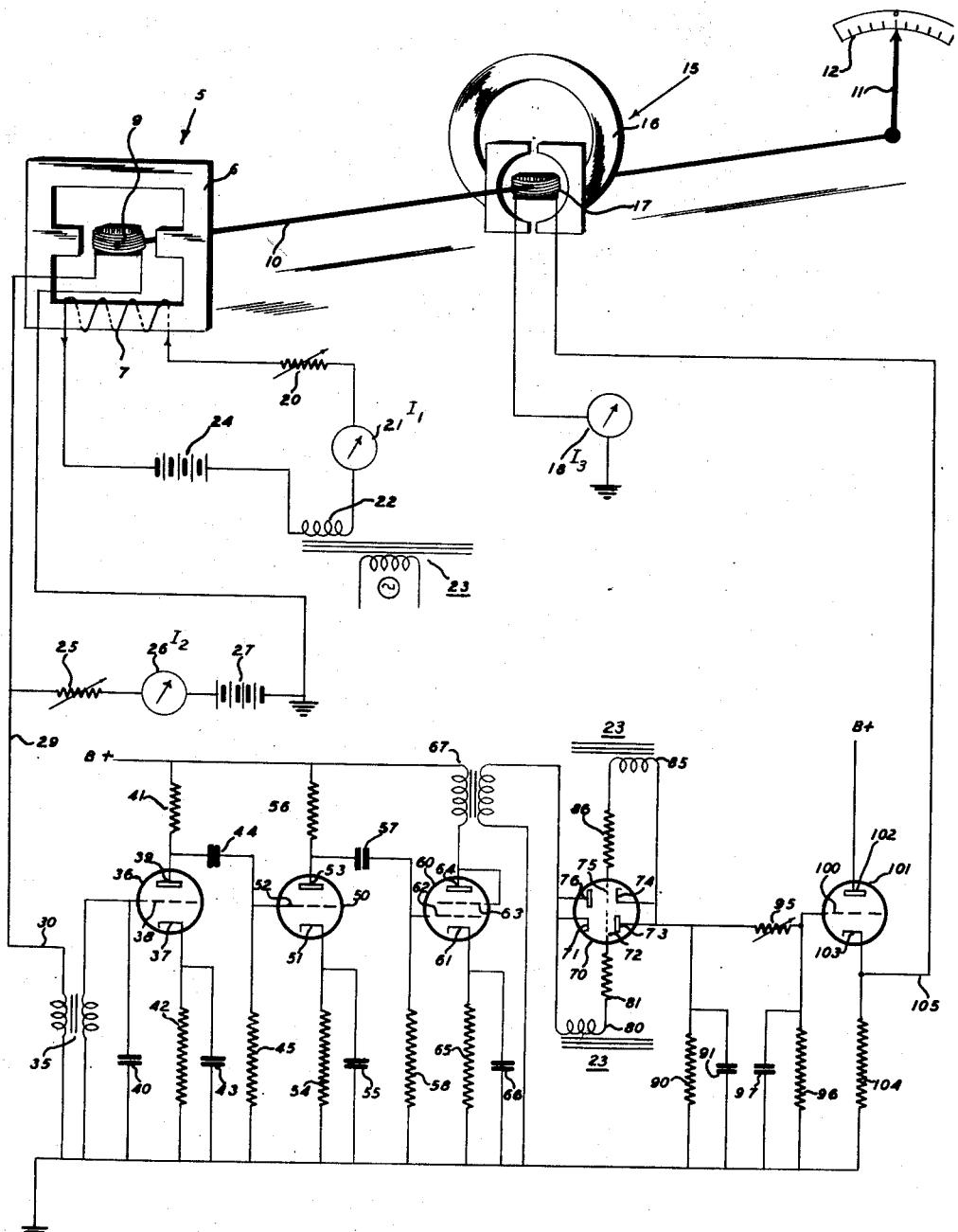
INVENTOR.
JAMES S ALLEN
BY
William D Hall.
Attorney Patented Dec. 26, 1950

2,535,250

UNITED STATES PATENT OFFICE 2,535,250

COMPUTING SYSTEM

James S. Allen, Santa Fe, N. Mex., assignor, by mesne assignments, to the United States of America as represented by the Secretary of War Application April 18, 1944, Serial No. 531,615

5 Claims. (Cl. 235—61)

This invention relates to a computing system and particularly to an electromechanical type computer for performing arithmetical operations such as squaring, square rooting, multiplying and dividing. The principal object of the invention is to provide a device of this character wherein torque producing current relationships are relied upon to accomplish the desired result.

The calculator utilizes a dynamometer type meter and a d'Arsonval type meter having their respective movable coils mounted on a common shaft, the said meters being supplied with current so that the torques produced in the two movable coils are opposed. Two given quantities in a proposed arithmetical computation are translated into two torque producing currents flowing in the above meter circuits. A third current, which represents the unknown value to be determined, appears in a third circuit to provide a counter-torque which maintains the rotatable shaft in a substantially neutral position.

The accompanying drawing is a diagrammatic view showing the arrangement of the two meters, and the associated circuits.

Referring to the drawing, a dynamometer type meter 5 has an iron core 6 of the shape shown providing the usual air gap, and a field coil consisting of winding 7. A movable coil 9 is disposed in the air gap and rigidly mounted on a rotatable shaft 10. Rotatable shaft 10 is provided with an indicator 11 arranged to move over a suitably calibrated scale 12, the scale having a central zero point corresponding to a no-coupling position of coil 9 with respect to the field of winding 7.

A d'Arsonval type meter is indicated by 15. This meter comprises a fixed permanent magnet 16 and a movable coil 17 disposed between the poles of the magnet and mounted on abovementioned shaft 10. A meter 18 indicates current through movable coil 17, this current representing one of the values, usually the unknown value, in a given problem.

Field winding 7 of the dynamometer is connected in series with variable resistance 20, a meter 21, the secondary winding 22 of a transformer 23, and a source of D. C. potential 24. Movable coil 9 of the same meter is connected in series with a variable resistance 25, a meter 26, and a source of D. C. potential 27, one side of this circuit being grounded. An output lead 29 extends to input terminal 30 of an amplifier and detector system hereinafter described.

Field winding 7 of the dynamometer is energized by a direct current which corresponds to one of the given independent quantities involved in a proposed calculation and which may be set at a predetermined value by variable resistance 20. This energizing direct current will be referred to as $i_1$. An alternating current of any suitable frequency such as 400 cycles per second is superimposed on current $i_1$ by means of transformer 23 to provide an error signal. A second direct current, $i_2$, which may represent a second given quantity in the calculation, flows through movable coil 9 of the dynamometer and is suitably controlled by variable resistance 25. The values of the two currents are visibly indicated by suitably calibrated meters 21 and 26, respectively.

In a dynamometer, the product of the two currents $i_1$ and $i_2$ through the separate coils multiplied by the cosine of the angle of the plane of movable coil 9 with the direction of the magnetic field flux is proportional to the torque tending to turn the rotating coil and its associated shaft 10. Assuming that the direct current ($i_1$ and $i_2$) conditions in the dynamometer produce a torque, an alternating current may be induced in movable coil 9 by the alternating component present in the field coil circuit. The amplitude of the induced alternating current will, of course, be proportional to the angle between movable coil 9 and the magnetic field in the air gap due to winding 7. The resulting alternating component in the movable coil circuit (error signal) is applied through lead 29 to input 30 of an amplifier system.

The amplifier system comprises input transformer 35, which feeds the error signal to vacuum tube amplifier 36 having cathode 37, control grid 38 and anode 39. Grid 38 is connected to ground through by-pass condenser 40, and anode 39 is connected to a suitable source of potential through dropping resistance 41. Cathode 37 is grounded through bias resistance 42 which is by-passed by condenser 43. A blocking condenser 44 is provided in the output circuit which is grounded through load resistance 45.

Potentials developed across load resistance 45 are applied to a second amplifier 50 having cathode 51, control grid 52 and anode 53. This amplifier is similarly provided with cathode bias resistance 54, by-pass condenser 55, dropping resistance 56, blocking condenser 57 and grid resistance 58 from which the output is applied to amplifier tube 60.

The tube 60 has cathode 61, control grid 62, screen grid 63 and anode 64. Screen grid 63 is connected to the anode 64, while cathode 61 is grounded through the parallel combination of bias resistance 65 and by-pass condenser 66. Anode 64 is connected to its source of potential through the primary winding of output transformer 67, which couples the output of the third amplifier stage to a detector tube 70.

Detector system 70 comprises two triodes, one having cathode 71, control grid 72 and anode 73, and the other having cathode 74, control grid 75 and anode 76. The secondary winding of output transformer 67 is connected between ground and anode 76, this latter being connected to cathode 71. Secondary winding 80 of transformer 23 is connected through resistance 81 across cathode 71 and grid 72 of the triode.

Anode 73 is connected to cathode 74 and thence to one end of another secondary winding 85 of transformer 23. The other end of this secondary winding is connected through resistance 86 to control grid 75. The potentials on grids 72 and 75 are sufficient to cause cut-off on the negative cycle. Thus potentials on the two control grids (from transformer 23) are in phase with each other and with the alternating current potential applied to the field coil of the dynamometer. The voltage (amplified error signal) applied through output transformer 67 to the connection of anode 76 and cathode 71 may be either in phase or out of phase with the alternating voltage on the grids, depending upon the direction of turning, however slight, of coil 9 from its neutral position. If in phase, the top section 74, 75, and 76 is conducting and the detected current is in one direction, while if out of phase, the lower section is conducting, and the detected current is in the opposite direction.

The pulsating detected current output from the common connection of anode 73 and cathode 74 divides into two branches, one of which is a phase correcting parallel network of resistance 90 and condenser 91. The other branch, also a phase correcting network, comprises the series-parallel combination of resistance 95, resistance 96 and condenser 97. Resistance 95 may be variable to vary the division of detected output between the two parallel circuits.

Potentials developed across resistance 96 are applied to control grid 100 of vacuum tube 101, this tube being arranged for cathode follower operation. Anode 102 is connected to a suitable source of B+ potential, while cathode 103 is grounded through cathode resistance 104. The output potentials from resistance 104 are applied through lead 105 to one end of movable coil 17, the other end thereof being grounded through meter 18. This cathode follower stage is utilized to isolate the coil circuit from the amplifier and detector stages, as well as to provide an impedance match between them. Output lead 105 could, of course, be connected to the positive end of any one of resistances 90, 95, or 96 and the cathode follower stage eliminated, if desired.

The detected current in movable coil 17 of d'Arsonval meter 15 is of appropriate sense and magnitude to provide an opposing torque by coil 17. This current, designated as $i_3$, is visibly indicated by meter 18.

Due to the amplification of the alternating current induced in movable coil 9, it requires only a slight movement of coil 9 from its neutral position, shown in the drawing, to produce a detected current through movable coil 17. By proper proportioning of the meters and currents passing through coil 17, the torque generated by coil 17 is just strong enough to balance the torque in the dynamometer due to the direct currents therein. It should be noted that the alternating currents induced in pick-up coil 9 are so small in value that no torque is produced as a result of such currents.

In a d'Arsonval meter the torque developed by the movable coil is proportional to current ($i_3$) through the coil and the cosine of the deflection angle away from neutral position. Similarly, in a dynamometer, torque is proportional to the two currents involved ($i_1$ and $i_2$) and the cosine of the same angle. As the movable coils in the two meters are maintained by the opposing torques very close to neutral position, the cosines of the two deflection angles (0°) are unity, or substantially so, and the following current equation may be written:

$$i_1 \times i_2 = K i_3$$

where K is a constant of proportionality. This equation indicates the mathematical operations, i. e. squaring, square rooting, multiplying and dividing, possible with the calculator.

Since the entire system has both electrical and mechanical feedback, it is important that oscillations be prevented. This may be accomplished by electrical damping in the amplifier stages or mechanical damping.

To perform a multiplication problem, for example, the multiplicand may be set as the predetermined current ($i_1$) through dynamometer field coil 7, and the multiplier may be set as the predetermined current ($i_2$) in movable coil 9. The product, $i_1$ times $i_2$, is represented by the current through movable coil 17 of the d'Arsonval meter. If gain in the system is adjusted so that the proportionality constant is unity, the product may be read directly on meter 18.

Potentiometers 20 and 25 for adjusting the currents in dynamometer coils 7 and 9, respectively, may be optionally ganged together to facilitate operations involving squaring or square rooting.

Having thus described the invention, what I claim as new and desire to secure by Letters Patent is:

1. A system of the character described comprising a dynamometer type meter and a d'Arsonval type meter, means for rigidly coupling the movable coils of said meters together, means for passing direct currents through the coils of said dynamometer meter, said means comprising separate circuits for each coil and separate means for adjusting the current in each coil to a predetermined value, said dynamometer coils undergoing rotation one with respect to the other due to said direct currents, means for impressing an alternating current on one of said dynamometer coils, means for amplifying and detecting only the alternating potentials induced in the other dynamometer coil, means for feeding a current through the d'Arsonval meter directly proportional to said detected current, for generating a torque in said d'Arsonval meter equal and opposed in direction to the force causing said dynamometer movable coil to rotate, and means for applying through said rigid coupling said mechanical d'Arsonval meter torque to said dynamometer coil.

2. A system of two moving coil type meters comprising at least one dynamometer, means for mechanically coupling the moving coils of said meters, means for passing direct currents through the coils of said dynamometer to rotate its moving coil away from its position of rest, said means comprising separate circuits for each coil and separate means for adjusting the current in each coil to a predetermined value, means for impressing an alternating current on one coil whereby an alternating voltage will be induced in the other coil of said dynamometer relative to the displacement of said moving coil from its position of rest, means for detecting the alternating voltage in said other coil, means responsive to said detected voltage to energize a coil in the other meter to mechanically restore the apparatus to a state of balance, and means for indicating the direct currents in each of said coils.

3. A mathematical product computer comprising an alternating current transformer having a primary stationary winding and a rotatable secondary winding, the normal relative position of said windings being such as to prevent transformer action, said primary being energized from an alternating current source; two sources of direct current signal each in circuit respectively with said primary and said secondary windings to effect a rotation of said secondary relative to said primary and the inducing of an alternating current correcting component in said secondary, means for amplifying said correcting component connected to said secondary, said amplifying means including means for detecting the relative direction of rotation of said secondary as a function of the phase of said alternating current component with respect to the supply from said alternating current source; a moving coil galvanometer having the coil thereof mounted on a shaft coupled with said secondary winding and a normal position of rest corresponding to that of said secondary; and means connected to be supplied from said detecting means, for applying a signal to said moving coil in correspondence with the direction and angle of rotation of said secondary from its normal position, whereby said moving coil causes a torque to be applied to said shaft tending to restore said secondary to its normal position.

4. A computer according to claim 3, and further including means in circuit respectively with said primary and secondary of said alternating current transformer for controlling the direct current flow in said circuits, and direct current indicator means in circuit respectively with said primary and said secondary of said alternating current transformer, and said moving coil of said galvanometer.

5. An electrodynamic system having a fixed and a movable portion, means for energizing said electrodynamic system, an electrodynamic balance normally existing in respect to said fixed and movable portions, means for feeding two separate electric quantities into said system for effecting an electrodynamic unbalance between said portions, said movable portion being caused to move thereby and a correcting signal voltage being produced therein proportional to said unbalance, an electro-mechanical system having a part mechanically coupled to said movable portion for mechanical control thereof, and means electrically supplied from said electrodynamic system for feeding back said correcting signal to said electro-mechanical system for effecting a motor action therein and a restoration of the balance of said electrodynamic system thereby.

JAMES S. ALLEN.

REFERENCES CITED

The following references are of record in the file of this patent:

UNITED STATES PATENTS

| Number | Name | Date |
|---|---|---|
| 1,907,804 | Hausman et al. | May 9, 1933 |
| 2,417,229 | Alexanderson | Mar. 11, 1947 |

OTHER REFERENCES

"Applications of the Electric Balance to the Continuous Solution of Mathematical Formulae," Borden, Instruments, Dec. 1929, pages 425–432.